United States Patent
Fu et al.

(10) Patent No.: US 8,427,581 B2
(45) Date of Patent: Apr. 23, 2013

(54) METHOD AND DEVICE FOR PROCESSING A MENU OF AN EXTERNAL DEVICE, AND TV RECEIVING DEVICE

(75) Inventors: Yaoyuan Fu, Shenzhen (CN); Yihua Chen, Shenzhen (CN); Tongjun Wang, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 14 days.

(21) Appl. No.: 13/378,368

(22) PCT Filed: Jun. 19, 2009

(86) PCT No.: PCT/CN2009/000681
§ 371 (c)(1),
(2), (4) Date: Dec. 15, 2011

(87) PCT Pub. No.: WO2010/145057
PCT Pub. Date: Dec. 23, 2010

(65) Prior Publication Data
US 2012/0086856 A1  Apr. 12, 2012

(51) Int. Cl.
*H04N 7/00* (2011.01)
*H04N 5/50* (2006.01)
*H04N 5/445* (2011.01)

(52) U.S. Cl.
USPC .............................. 348/552; 348/569; 348/563

(58) Field of Classification Search ................... 348/552, 348/553, 725, 569, 563, 564, 567; 725/39, 725/40, 43–47, 51, 92, 85, 100, 110, 115, 725/131, 133, 134, 139, 141, 142, 145, 151, 725/153; *H04N 7/00, 5/44, 5/50, 5/445*
See application file for complete search history.

(56) References Cited

U.S. PATENT DOCUMENTS

| | | | |
|---|---|---|---|
| 8,190,004 B2 * | 5/2012 | Lee et al. | 386/353 |
| 2012/0019721 A1 * | 1/2012 | Choi et al. | 348/564 |
| 2012/0120317 A1 * | 5/2012 | Lee et al. | 348/564 |

* cited by examiner

*Primary Examiner* — Sherrie Hsia

(57) ABSTRACT

A method and a device for processing a menu of an external device, and a TV receiving device are disclosed. By associating a displaying position of a menu of an external device of a display device with interface position information of an external interface, the present disclosure allows the menu of the external device to be displayed at an insertion position of the TV receiving device (i.e., a position corresponding to the external interface) so that the user can clearly know the using conditions of the external interface. This makes the TV receiving device intuitive and convenient to use.

10 Claims, 4 Drawing Sheets

METHOD AND DEVICE FOR PROCESSING A MENU OF AN EXTERNAL DEVICE, AND TV RECEIVING DEVICE

BACKGROUND

1. Technical Field

The present disclosure relates to the field of device interfaces, and more particularly, to processing of a menu of an external device.

2. Description of Related Art

With development of multimedia technologies and interface technologies, display devices with various kinds of interfaces become increasingly widespread, and a typical example of such display devices is a TV receiving device (TV set). Modern TV receiving devices provide users with various kinds of external device interfaces to extend functions thereof. An interface means an input/output (I/O) port of a display device; and a type of interface means a type of an interface between an external device and a display device (e.g., a TV receiving device) or a computer host to be connected. Typical examples of interfaces include universal serial bus (USB) interfaces, peripheral component interconnect (PCI) interfaces and the like. Generally when an external device is connected to a display device or a host, a menu of the external device will be displayed by the system. This menu generally appears on the display screen as an option list of various forms, and the option list generally comprises text data options, image data options, audio data options, video data options and the like. For example, when an external USB flash disk is used the first time on a display device (e.g., a computer) and is inserted in a corresponding interface (a USB interface in this case) of the computer, a message of "New hardware is found" will be reported by the computer and then a prompt of "The new hardware has been installed successfully and can be used now" (sometimes it may need to restart the computer) will be given. Then, a small icon is displayed at a fixed position (generally in a taskbar at the lower right corner of the computer's screen) on the computer's display device (e.g., an LCD display). This icon is just an "external device icon", and in this case, a USB device icon. However, this way of displaying a menu of an external device has a significant drawback: when there is more than one USB interface (including front interfaces and back interfaces) provided in the computer, it is impossible for the user to determine into which interface the USB device is inserted, and the prior art is still unable to display a menu of an external device at an insertion position (i.e., an interface position) of the display device.

BRIEF SUMMARY

An objective of the present disclosure is to provide a method and a device for processing a menu of an external device, and a TV receiving device. With the present disclosure, the shortcoming of the prior art that it is impossible to display a menu of an external device at an insertion position (i.e., an interface position) of a display device is overcome.

The present disclosure provides a method for processing a menu of an external device, which comprises the following steps of:

step a: storing external interface information into a memory;

step b: associating a displaying position of the menu of the external device with interface position information of the external interface of a display device when it is detected that the external device is connected to the display device through the external interface; and step c: displaying the menu of the external device on a corresponding position of a display screen according to the interface position information in the external interface information.

Preferably, the external interface information comprises interface code information and interface position information.

Preferably, in the step b, the external interface information stored in the memory is obtained according to the interface code information of the external interface used so as to obtain the interface position information.

Preferably, in the step c, the menu of the external device is displayed at the corresponding position on the display screen that corresponds to the position of the external interface according to a predetermined displaying mode of the menu of the external device.

The present disclosure further provides a device for processing a menu of an external device, which comprises an external interface connection detecting module, being configured to detect whether the external device is connected to a display device through an external interface; a memory, being configured to store external interface information comprising interface code information and interface position information; a displaying position associating module, being configured to associate a displaying position of the menu of the external device with an interface position of the external interface to which the external device is connected when the external interface connection detecting module detects that the external device is connected to the display device through the external interface; and an external device menu displaying module, being configured to display the menu of the external device at a corresponding position on a display screen that corresponds to the external interface position.

Preferably, the displaying position associating module further comprises:

an external interface information obtaining module, being configured to obtain the external interface information stored in the memory; and a displaying position setting module, being configured to set the menu of the external device to be displayed at the corresponding position on the display screen that corresponds to the position of the external interface according to the external interface information obtained by the external interface information obtaining module.

The present disclosure further provides a TV receiving device comprising at least one external interface, and the TV receiving device further comprises:

a memory, being configured to store external interface information comprising interface code information and interface position information;

an external interface connection detecting module, being configured to detect whether an external device is connected through the external interface;

a displaying position associating module, being configured to associate a displaying position of the menu of the external device with an interface position of the external interface to which the external device is connected when the external interface connection detecting module detects that the external device is connected through the external interface; and an external device menu displaying module, being configured to display the menu of the external device at a corresponding position on a display screen that corresponds to the external interface position.

Preferably, the displaying position associating module further comprises:

an external interface information obtaining module, being configured to obtain the external interface information stored in the memory; and a displaying position setting module, being configured to set the menu of the external device to be displayed at the corresponding position on the display screen that corresponds to the position of the external interface according to the external interface information obtained by the external interface information obtaining module.

Preferably, the TV receiving device further comprises a microprocessor, a remote-control receiving module, a display screen, a video processing module and an audio processing module.

Preferably, the TV receiving device is a liquid crystal TV set comprising a liquid crystal display (LCD) panel.

By associating a displaying position of a menu of an external device with interface position information of an external interface, the present disclosure allows the menu of the external device to be displayed at an insertion position of the TV receiving device (i.e., a position corresponding to the external interface) so that the user can clearly know the using conditions of the external interface. This makes the TV receiving device intuitive and convenient to use.

Hereinafter, implementations, functional features and advantages of the present disclosure will be further described with reference to embodiments thereof and the attached drawings.

DETAILED DESCRIPTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

Figure 1:
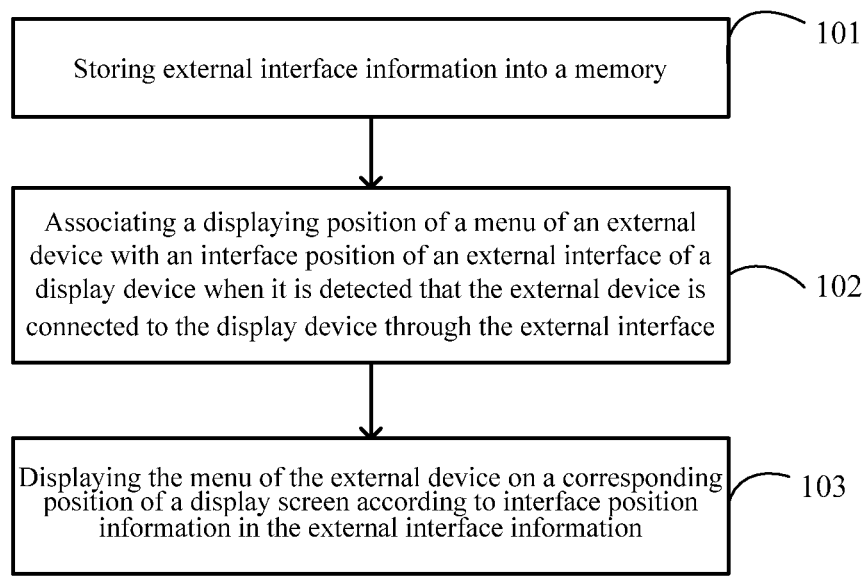
FIG. 1 is a flowchart diagram of a method for processing a menu of an external device according to the present disclosure.

Referring to FIG. 1, a preferred embodiment of a method for processing a menu of an external device of the present disclosure comprises the following steps.

Figure 2:
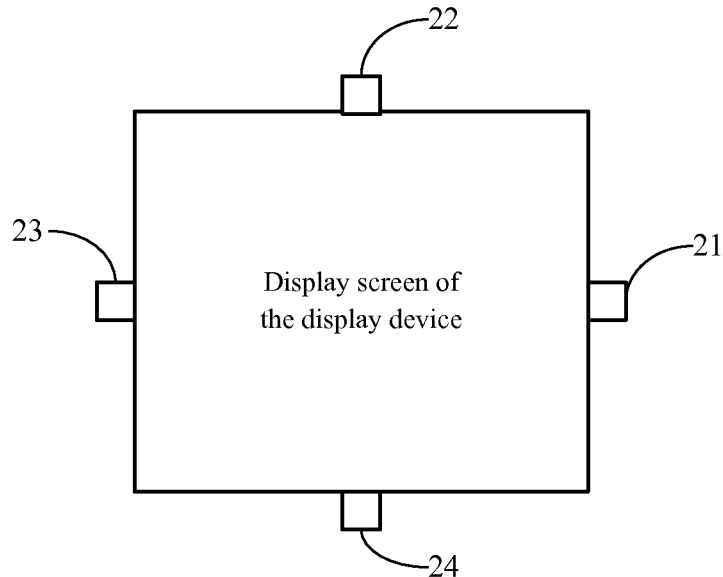
FIG. 2 is a schematic view of positional relationships between a kind of external interface information and a display screen of a display device.

Step 101: storing external interface information into a memory. The external interface information comprises external interface codes (serial Nos.) and external interface position information corresponding to the external interface codes. Referring to FIG. 2 together, there is shown a schematic view of positional relationships between a kind of external interface information and a display screen of a display device by way of example. Taking a rectangular display device as shown in FIG. 2 for example, the display device is provided with four external interfaces 21, 22, 23 and 24 on four side edges thereof respectively. External interface information of the four external interfaces are 'an external interface 21, position information of the external interface 21', 'an external interface 22, position information of the external interface 22', 'an external interface 23, position information of the external interface 23', and 'an external interface 24, position information of the external interface 24' respectively. That is, each of the external interface information comprises two kinds of information: interface code information and interface position information. In this preferred embodiment, interface position information comprises position information (on upside, on underside, on left side or on right side) of the external interface on the display device.

Step 102: associating a displaying position of the menu of the external device with interface position information of the external interface of a display device when it is detected that the external device is connected to the display device through the external interface. The detailed associating process comprises: obtaining the external interface information stored in the memory according to the interface code information of the external interface used so as to obtain the interface position information.

Step 103: displaying the menu of the external device on a corresponding position of a display screen according to the interface position information in the external interface information. In this way, the menu of the external device is displayed at an insertion position on the display device (i.e., a position of the external interface) so that the user can clearly know into which external interface the external device is inserted. For example, if the external device is inserted into the external interface 22, then a corresponding menu of the external device is displayed at a top side of the display device (a position near the external interface 22).

Figure 3:
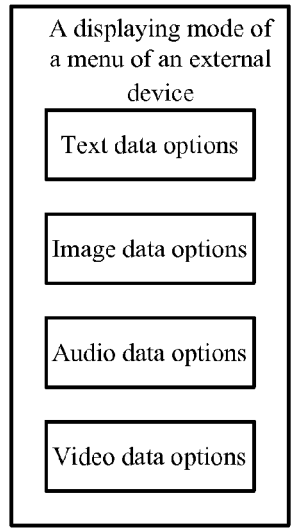
FIG. 3 is a displaying mode of the menu of the external device.
Figure 4:
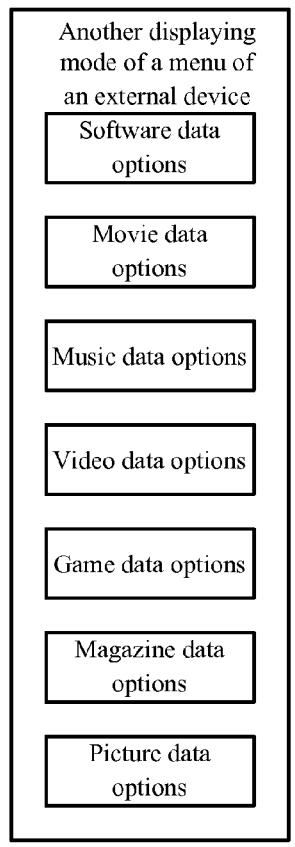
FIG. 4 is another displaying mode of the menu of the external device.

In step 103, the way of displaying specifically comprises: displaying the menu of the external device at the corresponding position on the display screen that corresponds to the position of the external interface according to a predetermined displaying mode of the menu of the external device. Referring to FIG. 3, there is shown a displaying mode of the menu of the external device. The displaying mode comprises text data options, image data options, audio data options and video data options. Of course, a displaying mode as shown in FIG. 4 may also be used as the displaying mode of the menu of the external device, and the displaying mode as shown in FIG. 4 comprises software data options, movie data options, music data options, video data options, game data options, magazine data options and picture data options.

Figure 5:
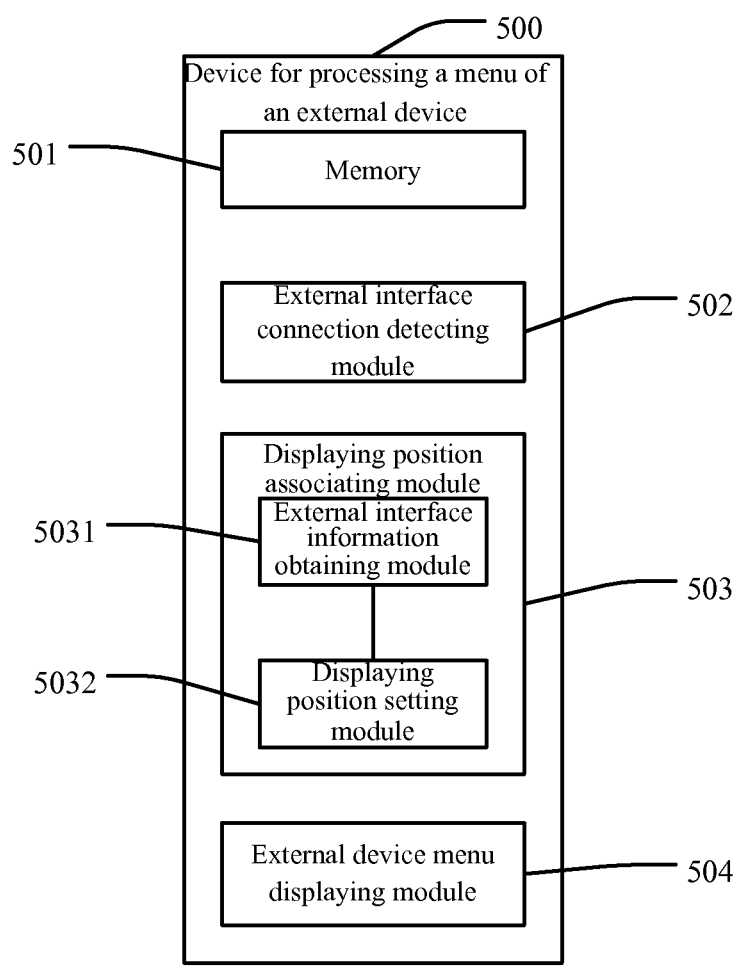
FIG. 5 is a schematic structural view of a device for processing a menu of an external device according to the present disclosure.

Referring to FIG. 5, a preferred embodiment of a device 500 for processing a menu of an external device according to the present disclosure comprises: a memory 501, being configured to store external interface information; an external interface connection detecting module 502, being configured to detect whether the external device is connected to a display device through an external interface; a displaying position associating module 503, being configured to associate a displaying position of the menu of the external device with an interface position of the external interface to which the external device is connected when the external interface connection detecting module 502 detects that the external device is connected to the display device through the external interface; and an external device menu displaying module 504, being configured to display the menu of the external device at a corresponding position on a display screen that corresponds to the external interface position.

The displaying position associating module 503 comprises: an external interface information obtaining module 5031, being configured to obtain the external interface information stored in the memory 501; and a displaying position setting module 5032, being configured to set the menu of the external device to be displayed at the corresponding position on the display screen that corresponds to the position of the external interface according to the external interface information obtained by the external interface information obtaining module 5031.

In the device 500 for processing a menu of an external device according to the present disclosure, the memory 501 is configured to store external interface information, and the external interface connection detecting module 502 is configured to detect whether the external device is connected to the display device through the external interface. When the external interface connection detecting module 502 detects that the external device is connected to the display device through the external interface, the external interface information obtaining module 5031 obtains the external interface information stored in the memory 501; then the displaying position setting module 5032 sets the menu of the external device to be displayed at the corresponding position on the display screen that corresponds to the position of the external interface according to the external interface information obtained by the external interface information obtaining module 5031; and the external device menu displaying module 504 displays the menu of the external device at the corresponding position on the display screen that corresponds to the external interface position. Thereby, the objective of displaying the menu of the external device at the insertion position on the display device (i.e., the external interface position) is achieved.

Figure 6:
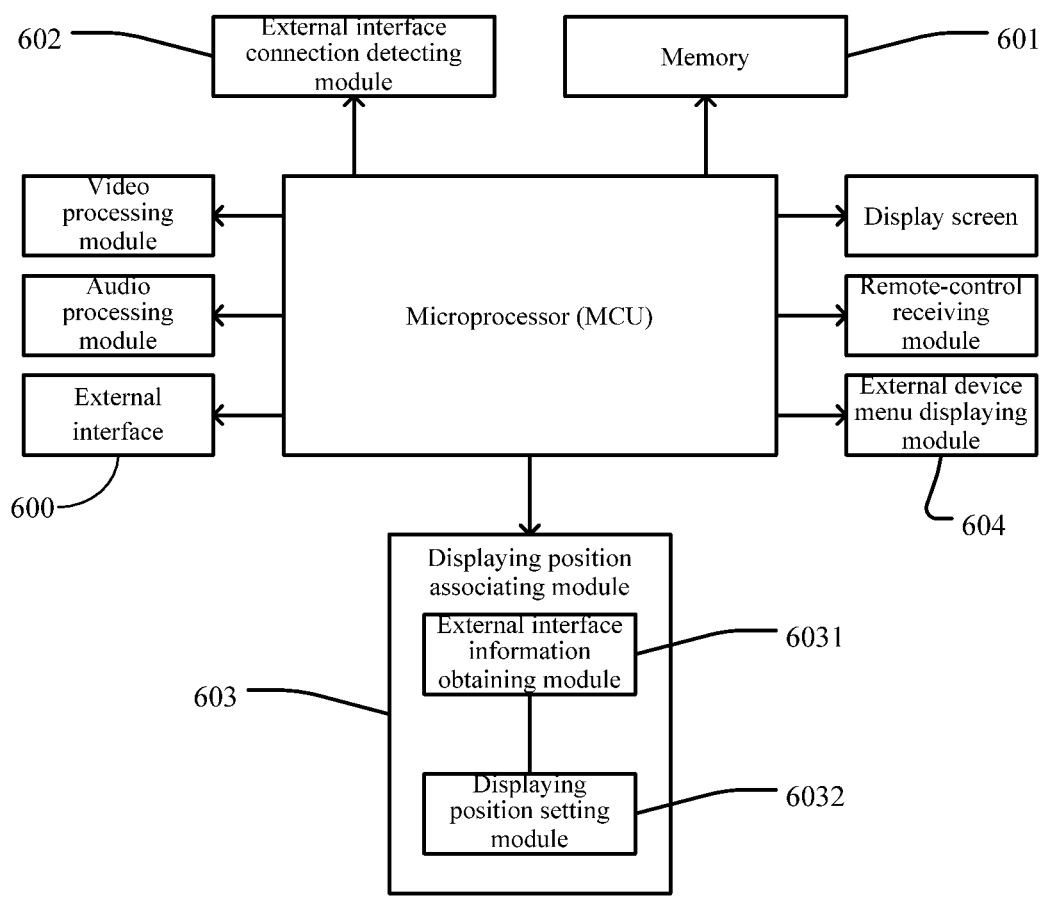
FIG. 6 is a schematic structural view of a TV receiving device according to the present disclosure.

Referring to FIG. 6, a TV receiving device of the present disclosure comprises all functional modules (e.g., a microprocessor MCU, a display screen, a remote-control receiving module, a video processing module and an audio processing module shown in FIG. 6, which are all well known in the art and will not be labeled in FIG. 6) commonly used in the conventional TV receiving devices, and further comprises:

at least one external interface 600;

a memory 601, being configured to store external interface information;

an external interface connection detecting module 602, being configured to detect whether an external device is connected through the external interface;

a displaying position associating module 603, being configured to associate a displaying position of the menu of the external device with an interface position of the external interface to which the external device is connected when the external interface connection detecting module 602 detects that the external device is connected through the external interface; and an external device menu displaying module 604, being configured to display the menu of the external device at a corresponding position on a display screen that corresponds to the external interface position.

The displaying position associating module 603 comprises: an external interface information obtaining module 6031, being configured to obtain the external interface information stored in the memory 601; and a displaying position setting module 6032, being configured to set the menu of the external device to be displayed at the corresponding position on the display screen that corresponds to the position of the external interface according to the external interface information obtained by the external interface information obtaining module 6031.

Typically, the TV receiving device of the present disclosure is a liquid crystal display (LCD) TV set, and the TV receiving device uses the memory 601 to store the external interface information and uses the external interface connection detecting module 602 to detect whether the external device is connected through the external interface. When the external interface connection detecting module 602 detects that the external device is connected through the external interface, the external interface information obtaining module 6031 obtains the external interface information stored in the memory 601; then the displaying position setting module 6032 sets the menu of the external device to be displayed at the corresponding position on the display screen that corresponds to the position of the external interface according to the external interface information obtained by the external interface information obtaining module 6031; and the external device menu displaying module 604 displays the menu of the external device at the corresponding position on the display screen that corresponds to the external interface position. Thereby, the objective of displaying the menu of the external device at the insertion position on the TV receiving device (i.e., a position corresponding to the external interface) is achieved. If the user inserts an external device (e.g., a DVD device) into a certain interface of the TV receiving device, then a menu of the DVD device will be displayed at a corresponding position on the display screen of the TV receiving device.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

The invention claimed is:

1. A method for processing a menu of an external device, comprising the following steps of:
   step a: storing external interface information into a memory;
   step b: associating a displaying position of the menu of the external device with interface position information of the external interface of a display device when it is detected that the external device is connected to the display device through the external interface; and
   step c: displaying the menu of the external device on a corresponding position of a display screen according to the interface position information in the external interface information.

2. The method for processing a menu of an external device of claim 1, wherein the external interface information comprises interface code information and interface position information.

3. The method for processing a menu of an external device of claim 2, wherein in the step b, the external interface information stored in the memory is obtained according to the interface code information of the external interface used so as to obtain the interface position information.

4. The method for processing a menu of an external device of claim 1, wherein in the step c, the menu of the external device is displayed at the corresponding position on the display screen that corresponds to the position of the external interface according to a predetermined displaying mode of the menu of the external device.

5. A device for processing a menu of an external device, comprising an external interface connection detecting module configured to detect whether the external device is connected to a display device through an external interface, wherein the device for processing a menu of an external device further comprises:
- a memory, being configured to store external interface information comprising interface code information and interface position information;
- a displaying position associating module, being configured to associate a displaying position of the menu of the external device with an interface position of the external interface to which the external device is connected when the external interface connection detecting module detects that the external device is connected to the display device through the external interface; and
- an external device menu displaying module, being configured to display the menu of the external device at a corresponding position on a display screen that corresponds to the external interface position.

6. The device for processing a menu of an external device of claim 5, wherein the displaying position associating module further comprises:
- an external interface information obtaining module, being configured to obtain the external interface information stored in the memory; and
- a displaying position setting module, being configured to set the menu of the external device to be displayed at the corresponding position on the display screen that corresponds to the position of the external interface according to the external interface information obtained by the external interface information obtaining module.

7. A TV receiving device, comprising at least one external interface, wherein the TV receiving device further comprises:
- a memory, being configured to store external interface information comprising interface code information and interface position information;
- an external interface connection detecting module, being configured to detect whether an external device is connected through the external interface;
- a displaying position associating module, being configured to associate a displaying position of the menu of the external device with an interface position of the external interface of a display device to which the external device is connected when the external interface connection detecting module detects that the external device is connected through the external interface; and
- an external device menu displaying module, being configured to display the menu of the external device on a corresponding position on a display screen that corresponds to the external interface position.

8. The TV receiving device of claim 7, wherein the displaying position associating module further comprises:
- an external interface information obtaining module, being configured to obtain the external interface information stored in the memory; and
- a displaying position setting module, being configured to set the menu of the external device to be displayed at the corresponding position on the display screen that corresponds to the position of the external interface according to the external interface information obtained by the external interface information obtaining module.

9. The TV receiving device of claim 7, wherein the TV receiving device further comprises a microprocessor, a remote-control receiving module, a display screen, a video processing module and an audio processing module.

10. The TV receiving device of claim 7, wherein the TV receiving device is a liquid crystal TV set comprising a liquid crystal display (LCD) panel.

* * * * *